Sept. 7, 1926.

E. ANDERSON

PORTABLE CAN OPENER

Filed May 10, 1926

1,598,841

Inventor
Edwin Anderson
by Miller + Boyken
Atty

Patented Sept. 7, 1926.

1,598,841

UNITED STATES PATENT OFFICE.

EDWIN ANDERSON, OF SAN FRANCISCO, CALIFORNIA, ASSIGNOR TO STAR CAN OPENER COMPANY, OF SAN FRANCISCO, CALIFORNIA, A CORPORATION OF CALIFORNIA.

PORTABLE CAN OPENER.

Application filed May 10, 1926. Serial No. 107,962.

This invention relates to a device for removing the top of a can by making a circumferential cut through the side wall of the can body, and is of the general character disclosed in my Patent 1,528,178 of March 3rd, 1925, more specifically the type shown in Figure 3 of said patent.

The principal object of the present invention is to provide a light, portable device with which the entire top of a can may be readily and quickly removed, without the operator touching the can with his hand and without securing the can in any particular position, and which device can at the same time be used for handling cans.

It is a further object of my invention to provide a light, portable can opener having a pressure roller, an advancing roller, a cutting disk with slidable connection interposed between the rollers so as to permit a slidable bodily movement of one of the rollers with respect to the other.

The above and other features of novelty, advantages and capabilities will become apparent from a detailed description of the accompanying drawings, in which I have illustrated a device embodying one form of my present invention, but the construction there shown will be understood as illustrative only and not as defining the limits of my invention.

Figure 1:
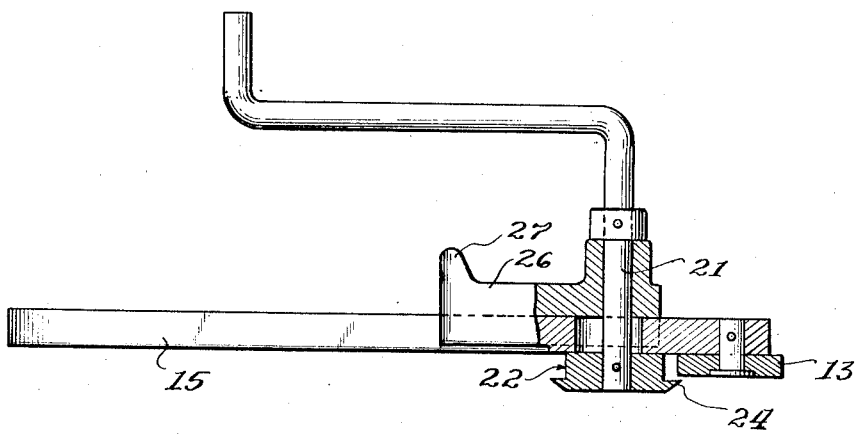
Figure 2:
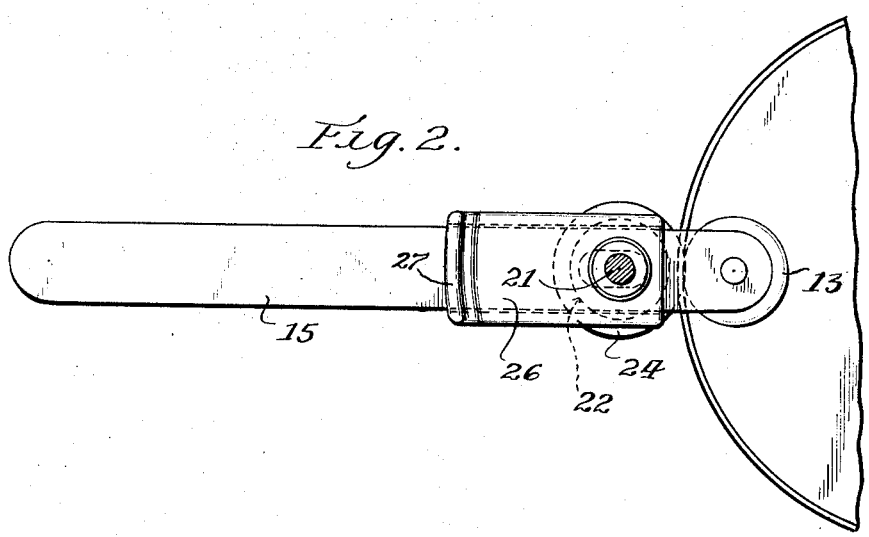

Figure 1 is an elevational view partly in section of a device embodying one form of my present invention, and Figure 2 is a top plan view of the same showing the device operatively disposed relative to a can.

The device as illustrated in the accompanying drawings is designed, intended and adapted to be applied to the end of a can and thereafter actuated to readily, quickly and positively cut through the side wall of the can body immediately below the double seam, as best illustrated in Fig. 1 of my former patent.

Generally described, it contemplates the use of a guide roller, operating with a pressure roller; a cutting disk mounted on the axis of one of the rollers adapted to cut through the side wall of the can as the advancing roller is operating, and a slidable connection adapted to permit a relative slidable bodily movement of said rollers when brought into and out of operative position.

Referring to the drawings in detail, there is provided a suitable handle member 15 adapted for gripping in one hand of an operator. Supported near one end of the handle member is a driving roller 22 and a pressure roller 13, mounted in opposed relation to each other and adapted to receive the flange of a can between them and movable toward and from each other, one of said rollers being adapted to engage the inner vertical surface and the other the outer vertical surface of the can flange. There is a cutting disk adjacent one of said rollers. In the particular form shown, the cutting disk is indicated at 24 formed integrally with the roller 22, but I do not limit myself to that particular form for any suitable modification will suffice so long as the cutting disk is so arranged as to cut through the side wall of the can immediately below the lid or double seam.

The roller 13 is revolubly mounted on a pin 14 carried by the inner extension of the handle member 15. The roller 22 is non-rotatably mounted on a spindle 21 which passes through a slot near one end of the handle member and also through a movable guiding and supporting member 26. In the illustrative form this member is shown as a slidable block mounted on the handle member 15 and adapted to slide with respect thereto. The spindle 21 is provided at its upper end with means for rotating the roller 22. In the particular illustration I have shown a right angle extension forming a suitable crank, but it is obvious that any suitable crank or key might be used.

The member 26 is movable or slidable with respect to the handle, so as to bring the rollers 13 and 22 into gripping relation with the can flange after positioning the device thereon, and is provided with a portion 27 adapted to receive pressure from the thumb so that the cutting disk 24 may be moved to penetrate the side wall of the can and the roller adjacent thereto to engage the can flange. It will thus be seen that I have provided a pin and slot connection interposed between the rollers, which permits the relative bodily slidable movement of the rollers when brought into and out of operation. Of course, I do not limit myself to the form shown, for many suitable modifications can be utilized without departing from the scope of my invention as defined by the following claims:

I claim:—

1. A can opener comprising a rigid handle member, a roller pivoted to one side thereof, a block slidable along the handle, a second roller carried by said block and adapted to be moved toward and away from the first named roller, a cutting disk disposed at the end of the second roller to penetrate the side wall of a can body, and a crank member for rotating said disk and the associated roller.

2. A can opener comprising a handle member, a roller pivoted to one side thereof, a block slidable along the handle, a second roller carried by said block and adapted to be moved toward and away from the first named roller, a cutting disk carried by the second roller to penetrate the side wall of a can body, and means for rotating one of said rollers.

3. In a portable can top remover, a handle member, a supporting member carried by said handle member and movable with respect thereto, guiding means for said supporting member, a driving roller, pressure means adjacent said driving roller spaced therefrom to receive a can flange between said driving roller and said pressure means, said driving roller being mounted on a spindle carried by one of said members and said pressure means being carried by the other of said members, said driving roller being adapted to engage the other side of said can flange, a cutting disk carried by one of said members and adapted to engage the outside wall of the can adjacent the can cover, and means for rotating said driving roller.

4. In a portable can top remover, a driving roller and a pressure roller revolubly mounted in opposed relation to each other and adapted to receive the flange of a can between them, said rollers being movable towards and from each other, one of said rollers being adapted to engage the inner surface and the other of said rollers being adapted to engage the outer surface of said flange, means for rotating said driving roller, a cutting disk associated with one of said rollers that is adapted to engage the outer surface of said can flange, said cutting disk being adapted to engage and sever the side wall of the can adjacent to said flange, a handle member, a support, one of said rollers being mounted on said handle member and the other of said rollers and said cutting disk being mounted on said support, said support being mounted for guiding sliding movements on said handle member whereby said rollers may be moved into engagement with said flange and said cutting disk into engagement with the side wall of said can.

5. In a portable can top remover adapted to cut through the side wall of the can immediately below the lid, a handle member, a pressure roller, a driving roller, a cutting disk associated with one of said rollers, means providing a slidable relation between said rollers so that they may be adjusted relatively to each other into opposed relation, and means for rotating the driving roller.

6. A portable can top remover adapted to be held in the hand of the operator during the cutting operation, comprising a handle member having an aperture therethrough, a supporting member carried by said handle member and adapted to move relative to said handle member, a spindle carried by said supporting member and extending freely through said aperture, a spindle carried by said handle member, a driving roller carried by one of said spindles, a pressure roller carried by the other of said spindles, a cutting disk associated with one of said rollers, said rollers being adapted to receive the flange of a can between them, said cutting disk being adapted to penetrate the side wall of the can adjacent said flange when said supporting member is moved to cause said rollers to engage said flange, and means for rotating said driving roller.

7. In a can top remover, a handle member having an aperture therethrough, a supporting member mounted on said handle member for limited movement relative to said handle member, a spindle carried by said supporting member and extending through said aperture and adapted to move therein, a spindle carried by said handle member, a driving roller mounted on one of said spindles, a pressure roller mounted on the other of said spindles, said rollers being adapted to receive the flange of a can between them, one of said rollers being adapted to engage the inner surface and the other of said rollers being adapted to engage the outer surface of said flange, means for rotating said driving roller, a cutting disk associated with that one of said rollers that is adapted to engage the outer surface of said flange, said cutting disk being adapted to penetrate the side wall of the can adjacent said flange when said supporting member is moved to cause said rollers to engage said flange.

8. In a portable can top remover adapted to cut through the side wall of a can, a driving roller and a pressure roller adapted to engage opposite sides of a can flange and mounted upon relatively movable supports embodying a handle, said supports having a sliding guide connection, one of said rollers being mounted on one and the other of said rollers being mounted on the other of said supports, a cutting disk associated with one of said rollers adapted to engage the side wall of a can when said supports are moved to cause said rollers to engage said can flange, and means for rotating said driving roller.

9. A portable can top remover adapted to cut through the side wall of a can, comprising a handle, a driving roller, a pressure roller, a cutting disk associated with one of said rollers, mountings for said rollers including a sliding connection adapted to permit the relatively bodily movement of said rollers and means for rotating the driving roller.

10. A portable hand tool for removing can tops by making a circumferential cut through the side wall below the lid, comprising a handle member, a roller nonslidably mounted on said handle, a second roller slidably mounted on said handle and adapted to be brought into opposed relation with the first roller when in operation, said handle member being so relatively positioned with respect to the rollers that it will extend outwardly from a can while in operation, a cutting disk carried by one of said rollers, and means directly connected with one of said rollers for rotating it.

11. A portable hand tool for removing can tops by making a circumferential cut through the side wall below the lid, comprising a handle member, a roller nonslidably mounted on said handle, a slidable roller-support mounted on said handle, a second roller movable with said slidable support, said handle member being so relatively positioned with respect to the rollers that it will extend outwardly at right angles from the can while in operation, a cutting disk associated with one of said rollers, and means directly connected with and for rotating one of said rollers.

12. In a portable hand can-top remover, a bar handle member, a supporting member slidably mounted on said handle member, a driving roller revolubly mounted on one and a pressure roller revolubly mounted on the other of said members in opposed relation to each other and adapted to receive the flange of a can, one of said rollers being adapted to engage the inner surface and the other of said rollers being adapted to engage the outer surface of the can flange, means for rotating said driving roller, a cutting disk associated with one of said rollers and adapted to sever the side wall of the can adjacent the can flange when the supporting member is moved to cause said rollers to engage the can flange and when the driving roller is operated.

EDWIN ANDERSON.